United States Patent
Krug et al.

(10) Patent No.: US 6,307,197 B1
(45) Date of Patent: Oct. 23, 2001

(54) OPTOELECTRONIC COMPONENT AND METHOD FOR CALIBRATING AN OPTOELECTRONIC COMPONENT

(75) Inventors: Joachim Krug, Neutraubling; Joachim Reill, Zeitlarn, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/408,466

(22) Filed: Sep. 29, 1999

(30) Foreign Application Priority Data

Sep. 29, 1998 (DE) ................................ 198 44 701

(51) Int. Cl.[7] .............. G02B 6/26; G02B 6/36; G02B 6/42
(52) U.S. Cl. ................. 250/227.24; 250/227.28; 385/90; 385/92
(58) Field of Search ................. 385/88, 90, 92; 250/227.24, 227.28, 227.3, 214 R

(56) References Cited

U.S. PATENT DOCUMENTS

| | | | |
|---|---|---|---|
| 5,305,091 | * 4/1994 | Gelbart et al. | 356/375 |
| 5,390,271 | * 2/1995 | Priest | 385/92 |
| 5,600,741 | * 2/1997 | Hauer et al. | 385/35 |
| 5,623,337 | * 4/1997 | Iori et al. | 356/153 |
| 6,031,953 | * 2/2000 | Rekow et al. | 385/49 |

FOREIGN PATENT DOCUMENTS

| | | | |
|---|---|---|---|
| 3543558A1 | * 6/1987 | (DE) | G02B/6/42 |
| 4436204C1 | 3/1996 | (DE) | . |
| 4440935A1 | 5/1996 | (DE) | . |

\* cited by examiner

*Primary Examiner*—Seungsook Ham
*Assistant Examiner*—Eric Spears
(74) *Attorney, Agent, or Firm*—Herbert L. Lerner; Laurence A. Greenberg; Werner H. Stemer

(57) ABSTRACT

A method for calibrating an optoelectronic component having a light emitter/receiver unit and a connection unit includes the steps of setting an initial relative position of a first part and a second part of the connection unit. After that, the first part is displaced in a reference plane relative to the light emitter/receiver unit. Next, the first part is affixed to the light emitter/receiver unit. Then the second part is displaced relative to the first part and is also affixed to the light emitter/receiver unit. An optoelectronic component is also provided.

20 Claims, 2 Drawing Sheets

OPTOELECTRONIC COMPONENT AND METHOD FOR CALIBRATING AN OPTOELECTRONIC COMPONENT

BACKGROUND OF THE INVENTION

Field of the Invention

The invention relates to an optoelectronic component, which includes a light emitter unit and/or a light receiver unit and a connection unit for coupling a fiber-optic wave guide. The invention also relates to a method for calibrating an optoelectronic component.

Fiber-optical components of this type are typically used as transmitting or receiving modules for optical transmission paths in telecommunications or data communications applications. A two-piece construction of the component with a light emitter/light receiver unit and a connection unit (also called a receptacle) has proved favorable, among other reasons because of its simple construction and its modularity. However, the required mutual alignment or calibration of the two units can cause difficulties.

SUMMARY OF THE INVENTION

It is accordingly an object of the invention to provide a method for calibrating an optoelectronic component which overcomes the disadvantages of the heretofore-known methods of this general type and which can be easily performed and results in a precise calibration of an optoelectronic component having a light emitter/light receiver unit and a connection unit provided for coupling a fiber-optic wave guide. It is a further object of the invention to provide an optoelectronic component whose structural configuration makes it possible to employ the method of the invention.

With the foregoing and other objects in view there is provided, in accordance with the invention, a method for calibrating an optoelectronic component, which comprises the steps of:

providing a light emitter unit having a light emitter for transmitting a beam of light along a first direction; providing a connection unit including a first part and a second part, the first part having a deflection mirror, the second part provided for mounting a fiber-optic wave guide and being displaceable toward and away from the deflection mirror relative to the first part;

providing an optical element disposed in a beam path between the light emitter and the second part;

turning on the light emitter;

setting an initial relative position between the first part and the second part;

calibrating the first part relative to the light emitter unit, while maintaining the initial relative position between the first part and the second part, by displacing the first part in a structurally predetermined reference plane intersecting the first direction, such that the beam of light strikes the deflection mirror and a deflected beam of light leaves the deflection mirror, the deflected beam of light striking an end face of the fiber-optic wave guide essentially centrally in a second direction extending essentially parallel to the reference plane;

fixing a relative position between the first part and the light emitter unit in a first calibrated position;

calibrating the second part relative to the first part by displacing the second part in the second direction relative to the first part such that a given condition with respect to a location of an optical image plane of the optical element relative to a location of the end face of the fiber-optic wave guide is met; and fixing a final relative position between the first part and the second part in a second calibrated position.

With the objects of the invention in view there is also provided, a method for calibrating an optoelectronic component, which comprises the steps of:

providing a light receiver unit having a light receiver for receiving a beam of light running along a first direction;

providing a connection unit including a first part and a second part, the first part having a deflection mirror, the second part provided for mounting a fiber-optic wave guide and being displaceable toward and away from the deflection mirror relative to the first part;

providing an optical element disposed in a beam path between the light receiver and the second part;

turning on an external light emitter coupled to the fiber-optic wave guide at a free end thereof such that the beam of light leaves the fiber-optic wave guide along a second direction;

turning on the light receiver;

setting an initial relative position between the first part and the second part;

calibrating the first part relative to the light receiver unit, while maintaining the initial relative position between the first part and the second part, by displacing the first part in a structurally predetermined reference plane intersecting the first direction and being essentially parallel to the second direction, such that the beam of light strikes the deflection mirror and a deflected beam of light strikes substantially centrally an opening cross-sectional face of the light receiver in the first direction;

fixing a relative position between the first part and the light receiver unit in a first calibrated position;

calibrating the second part relative to the first part by displacing the second part in the second direction relative to the first part such that a given condition with respect to a location of an optical image plane of the optical element relative to a given location of the opening cross-sectional face of the light receiver is met; and fixing a final relative position between the first part and the second part in a second calibrated position.

In accordance with another mode of the invention, the structurally predetermined reference plane is oriented in a direction perpendicular to the first direction.

In accordance with yet another mode of the invention, an optical element with a lens is disposed in the beam path between the deflection mirror and the fiber-optic wave guide.

With the objects of the invention in view there is further provided, an optoelectronic component, comprising:

a light emitter unit and/or a light receiver unit containing a light emitter and/or a light receiver for transmitting and/or receiving a beam of light extending along a first direction;

a connection unit in contact with the light emitter unit and/or light receiver unit and having a first part at a first end and a second part at a second end thereof;

the first part being displaceable with respect to the light emitter unit and/or light receiver unit in a structurally predetermined reference plane intersecting the first direction;

the second part configured for mounting a fiber-optic wave guide such that the beam of light extends in a second direction substantially parallel to the structurally predetermined reference plane on entering and/or emerging from the fiber-optic wave guide;

a deflection mirror, mounted on the first part, for deflecting the beam of light between the fiber-optic wave guide and the light emitter and/or light receiver, the second part being displaceable relative to the first part in the second direction toward or away from the deflection mirror; and an optical element disposed in a path of the beam of light between the fiber-optic wave guide and the light emitter and/or light receiver.

The two-part construction of the connection unit allows the calibration process according to the invention to be performed in two separate calibration steps and makes it possible to adapt the light emitter/light receiver to the fiber-optic wave guide both with regard to a desired beam path geometry and with regard to a desired focal condition of the deflected or reflected beam of light. In the first step, by a simple displacement of the first part relative to the light emitter/light receiver unit in a structurally given reference plane, it is achieved that the deflected beam of light—in the case of a light emitter unit—strikes an end face of the fiber-optic wave guide essentially centrally, or—in the case of a light receiver unit—essentially centrally strikes a cross-sectional area of an opening of the receiver. Because the deflected beam of light is coupled centrally, either into the fiber-optic wave guide or into the receiver, undesired adaptation losses from an inadequate beam path alignment are kept as small as possible.

The second calibration step, performed by a displacement of the second part relative to the first part in a second direction (beam direction), makes it possible to set a desired focal condition. For a light emitter unit, the desired focal condition can for instance be that the image plane or focal plane of the optical element used coincides with the end face of the fiber-optic wave guide, or diametrically intersects it (if the end face is inclined relative to the x direction). However, still other focal conditions are also possible and may possibly even be advantageous. For instance, the location of the image plane relative to the location of the end face of the fiber-optic wave guide can be set such that a defined, predetermined size of the light spot on the end face of the fiber-optic wave guide is achieved, wherein the focus of the deflected beam of light can be located outside or away from the end face of the fiber-optic wave guide.

Because of the parallelism of the second direction and the reference plane, the second calibration step also takes place in the reference plane. The complete course of calibration (first and second steps) is therefore biaxial and can thus be achieved in a simple way.

In the case where a light receiver is used, conditions are comparable to the conditions when a light emitter unit is used. In that case, the second calibration step E makes it possible for instance to focus the deflected beam of light at a cross-sectional face of an opening of the receiver located in a predetermined position.

The optical element can in principle be disposed at any point between the light emitter/light receiver and the fiber-optic wave guide. In a preferred variant embodiment of the method, the optical element includes a lens disposed between the deflection mirror and the fiber-optic wave guide. The size and position of the lens can be selected such that in the position calibrated in the first calibration step, the beam path passes in a decentralized manner through the lens. The result attained is that a beam reflected by the lens cannot travel back to the light emitter and cause interference there.

In the optoelectronic component according to the invention, constructed to be suitable for performing the method of the invention, the first part is displaceable relative to the light emitter and/or light receiver unit in a structurally dictated reference plane that intersects the first direction; a beam of light entering or exiting the fiber-optic wave guide extends in a second direction (x-direction) which is essentially parallel to the reference plane, and the second part is displaceable relative to the first part in the second direction toward or away from the deflection mirror.

A simple overall construction of the optoelectronic component is obtained if the reference plane is realized by a cover plate of a module housing that receives the light emitter and/or light receiver unit.

Another advantageous embodiment is characterized in that the first part has a guide face extending in the predetermined second direction, and this guide face is in sliding contact with a counterpart guide face of the second part. In this way, the second calibration step can be performed very precisely by sliding the counterpart guide face of the second part along the guide face of the first part.

A central axis of the fiber-optic wave guide, or of a socket embodied in the second part for receiving a fiber connector of the fiber-optic wave guide, advantageously extends at an angle $\alpha$ relative to the second direction, and an end face of the fiber-optic wave guide is inclined at an angle $2\alpha$ relative to a normal plane with respect to the central axis. As a result, on the one hand, light thrown back from the end face of the fiber-optic wave guide is prevented from returning to the light emitter (which is realized either in the optoelectronic component itself or, if this component is a light receiver unit, it is realized as an external light emitter 44) and, on the other hand, by beveling or inclining the end face at an angle of $2\alpha$, the desired bending of the beam path at an angle $\alpha$ upon entry to and exit from the fiber-optic wave guide is attained.

Other features which are considered as characteristic for the invention are set forth in the appended claims.

Although the invention is illustrated and described herein as embodied in an optoelectronic component and a method for calibrating an optoelectronic component, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
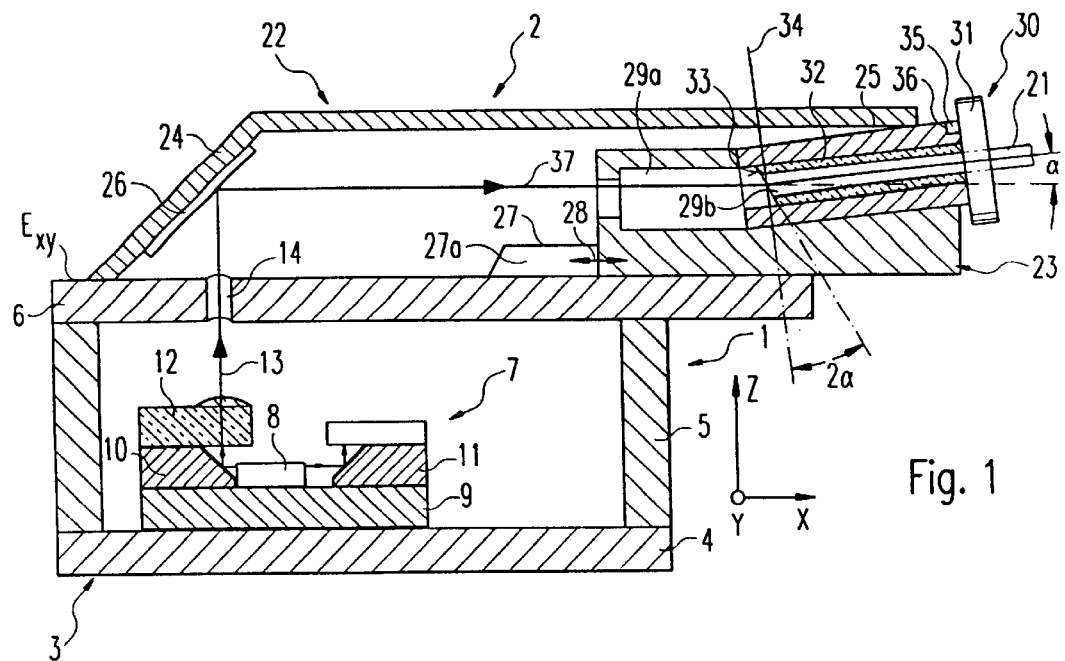
FIG. 1 is a diagrammatic sectional view of an optoelectronic component that includes a light emitter.

Referring now to the figures of the drawings in detail and first, particularly, to FIG. 1 thereof, there is shown an optoelectronic light emitter component, which is constructed of a light emitter unit 1 and a connection unit (receptacle) 2.

The light emitter unit 1 has a module housing 3, which includes a bottom plate 4, a circumferential wall 5, and a cover plate 6. The bottom plate 4, circumferential wall 5 and cover plate 6 may be made of metal, for instance.

A laser module 7 is accommodated in the module housing 3. The laser module 7 uses a laser chip 8 which is disposed on a silicon substrate 9. The substrate 9 also carries two deflection prisms 10, 11, which are disposed one on either side of the laser chip 8 and have mirrored surfaces, which are oriented in an angle of 45° to the active zone of the laser chip 8. A coupling lens 12 is applied to one deflection prism 10 and disposed such that a beam of light 13, generated in the laser chip 8 and deflected by the deflection prism 10, passes essentially coaxially through the coupling lens 12 and exits the module housing 3 through an outlet opening 14 in the cover plate 6. The direction of the beam of light 13 passing through the opening 14 defines the z-direction.

The connection unit (receptacle) 2 serves to couple a fiber-optic wave guide 21 to the light emitter unit 1. It substantially includes a first part 22 and a second part 23. The first part 22 is hood-like, and on one lateral end it has an oblique wall region 24, while on its other, opposed lateral end it has an opening 25. A deflection mirror 26 is mounted on the inside of the oblique wall region 24.

The first part 22 also has an inward-pointing longitudinal edge 27, with a highly smooth or planar guide face 27a on which the second part 23 can be displaced in the direction of the double arrow 28 in the manner of a carriage by a counterpart guide face, not visible in FIG. 1 but also embodied with a very smooth surface. The guide face 27a extends parallel to a line normal to the deflection mirror 26.

The surface of the cover plate 6 defines a reference plane $E_{xy}$, which in the example shown extends perpendicular to the z-direction. The first part 22 is displaceable on the cover plate 6, or in other words in the reference plane $E_{xy}$.

The direction of the double arrow 28 (direction of displacement of the second part 23 relative to the first part 22) is predetermined by the line of abutment between the cover plate 6 and the guide face 27a of the longitudinal edge 27 of the first part 22.

The second part 23 is formed as a hollow part, and it has both an axial bore 29a and an oblique bore 29b communicating with it. The oblique bore 29b is inclined at an acute angle $\alpha$ (for instance, $\alpha=6°$) relative to the axial bore.

The oblique bore 29b serves as a socket for a fiber connector 30. The fiber connector 30 includes a fiber flange 31, which is mounted positionally fixed on the fiber-optic wave guide 21, and a ceramic sleeve 32, which circumferentially sheaths the fiber-optic wave guide 21 in an end region upstream of (in front) the fiber flange 31. On its end toward the fiber flange, the fiber-optic wave guide 21 has an end face 33, which is inclined by an angle $2\alpha$ relative to a normal plane 34 to the central axis of the oblique bore 29b.

The ceramic sleeve 32 is fitted dimensionally precisely into the oblique bore 29b; the terminal position of the fiber connector 30 is defined in the axial direction by the fiber flange 31, which acts as a stop. The fiber flange 31 can furthermore be equipped with an engagement peg 35, which engages a complimentary recess 36 in the second part 23 and assures a defined rotational position of the fiber connector 30 in the second part 23.

The method according to the invention for calibrating the optoelectronic component 1 can be performed as follows:

When the laser chip 8 is put into operation, it emits a beam of light 13, which as already discussed passes through the coupling lens 12 and is focused by it at a predetermined image distance W which is defined as the distance between the principal plane of the coupling lens 12 and the image plane.

The calibration of the connection unit (receptacle) 2 is completed in two steps. The first is a calibration of the first part 22 relative to the light emitter unit 1, wherein the second part 23, precalibrated relative to the first part 22, is entrained with the first part 22 having the fiber connector 30 inserted positionally correctly into the oblique bore 29b. The entrainment can be effected for instance by a suitably embodied manipulation device which is not shown. The first part 22 is now displaced on the cover plate 6 of the module housing 3 of the light emitter unit 1 in such a way that the beam of light 13 strikes the deflection mirror 26, and a deflected beam of light 37 leaves this mirror.

In the example shown, the reference plane $E_{xy}$ extends perpendicular to the z-direction, and the deflection mirror 26 is inclined by an angle of 45° relative to the incident beam of light 13 (z-direction). As a consequence, the deflected beam of light 37 always extends parallel to the reference plane $E_{xy}$, regardless of the position of the first part 22. The direction of the deflected beam of light 37 will hereinafter be called the x-direction.

The location of the first part 22 relative to the module housing 3 of the light emitter unit 1 is set by a displacement of the first part 22 in the x-direction, such that the deflected beam of light strikes the end face 33 of the fiber-optic wave guide 21 centrally with respect to a projection of the z-direction. The optimal location can be ascertained from the incidence of a maximum intensity at the output of the fiber-optic wave guide 21.

The y-direction is defined as the direction that is perpendicular to both the x-direction and the z-direction. By calibrating the first part 22 in the y-direction, it is achieved that the deflected beam of light 37 strikes the end face 33 of the fiber-optic wave guide 21 also centrally with respect to the y-direction.

As a result, by the described first calibration step of the first part 22 in the x-direction and in the y-direction, a precise and final positioning of the deflected beam of light 37 onto the center of the end face 33 of the fiber-optic wave guide 21 is brought about.

After that, the first part 22 is affixed to the cover plate 6 of the module housing 3.

In a second calibration step, a focal condition of the deflected beam of light 37 is set. For example, the deflected beam of light 37, in order to attain a good coupling of light into the fiber-optic wave guide 21, should be focused at the end face 33 of the fiber-optic wave guide. To that end, the second part 23 is displaced in the x-direction (that is, along the direction of the deflected beam of light 37) until the image plane of the coupling lens 12 coincides with the end face 33 of the fiber-optic wave guide 21, or, if a beveled end face 33 is provided, until it intersects this face axially centrally. In other words, the length of the beam path between the optical principal plane of the coupling lens 12 and the center point of the end face 33 of the fiber-optic wave guide 21 is set such that it is identical to the image distance W.

The displacement of the second part 23, in the example shown, is effected both along the cover plate 6 and along the guide face 27a of the first part 22. Since the surface of the cover plate 6 here represents precisely the reference plane $E_{xy}$ (that is, it is parallel to the x-direction), and since, as already mentioned, the guide face 27a extends parallel to the normal of the deflection mirror surface, the line of abutment between the guide face 27a and the surface of the cover plate 6 extends in the x-direction. It is thus assured that the displacement of the second part 23 (in accordance with the double arrow 28) that is performed along this line of abutment is in fact effected in the direction of the deflected beam of light (the x-direction). This assures that in the second calibration step, the centering of the beam in the middle with respect to the end face 33 of the fiber-optic wave guide 21, set in accordance with the first calibration step, is maintained.

Because the central beam centering is maintained, it is also possible in the second calibration step to perform the setting of the location of the second part 23 relative to the first part 22 by monitoring and maximizing the light intensity coupled out from the fiber-optic wave guide 21.

The displacement of the second part 23 to be done in the x-direction in the second calibration step need not be done along a correspondingly oriented guide face 27a of the first part 22, but instead can be achieved structurally in some other way as well.

The direction of the deflected beam of light 37 (x-direction) entering the fiber-optic wave guide need not be perpendicular to the direction (z-direction) of the beam of light leaving the light emitter unit 1. Furthermore, the reference plane $E_{xy}$ may also be defined or realized in some other way than by the cover plate 6 of the module housing 3 of the light emitter unit 1.

After the position found in the second calibration step is set, the second part 23 is fixed relative to the first part 22, for instance by being soldered or welded to the cover plate 6. The desired optimal coupling of the fiber-optic wave guide 21 to the light emitter unit 1 is thereby achieved.

The optoelectronic component 1, 2 may for instance be embodied using SMD (surface mounted device) technology. For mounting the component 1, 2 on an assembly surface, which is not shown, the fiber connector 30 is disconnected from the connection unit 2; the opening 25 is covered; and the optoelectronic component 1, 2 is soldered to the assembly surface. After that, the fiber connector 30 is reinserted into the oblique bore 29b, and the component 1, 2 is ready for operation.

Figure 2:
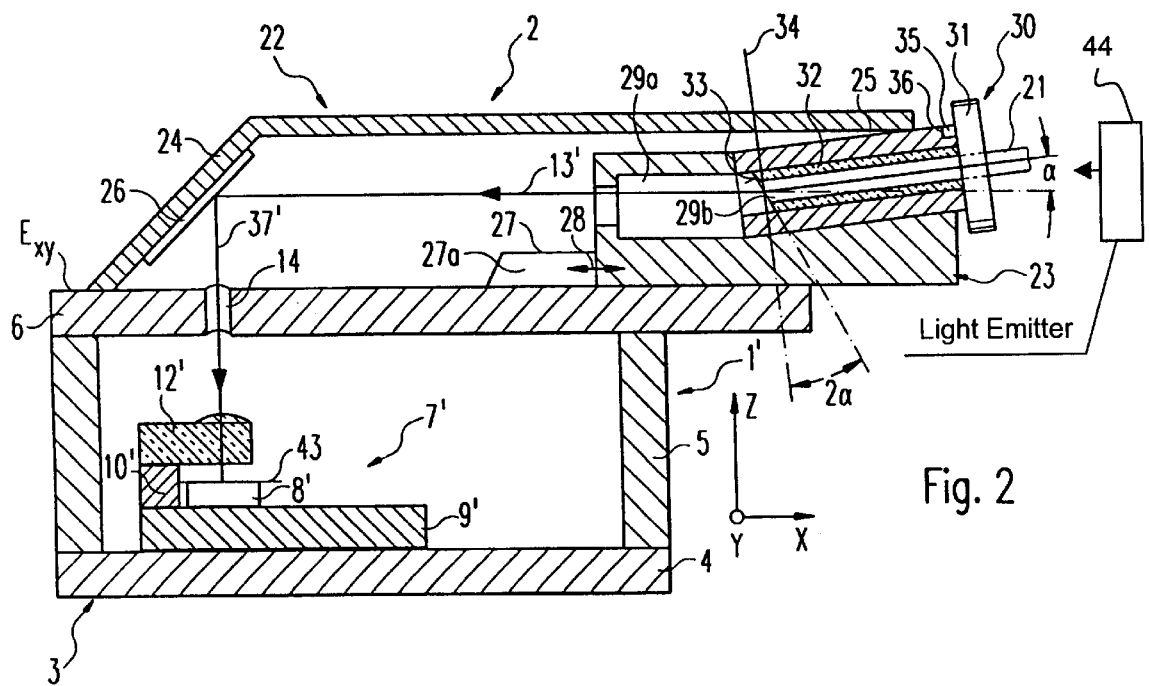
FIG. 2 is a diagrammatic sectional view of an optoelectronic component that includes a light receiver.

FIG. 2 shows a further optoelectronic component, which differs from the component shown in FIG. 1 essentially only in that instead of the light emitter unit 1, a light receiver unit 1' is provided. Elements comparable to those of FIG. 1 are identified by the same reference numerals.

A receiver module 7' located in the module housing 3 has a silicon substrate 9', which carries both a spacer element 101 and a photo detector 8'. A coupling lens 12' is disposed above the spacer element 10'.

A beam of light 13' emerging from the fiber-optic wave guide 21 is deflected at the deflection mirror 26. The deflected beam 37' passes through an opening 14 in the cover plate 6 to enter the module housing 3 of the light receiver unit 1'.

The calibration of the connection unit 2 relative to the light receiver unit 1' is done analogously to the method described in conjunction with FIG. 1. The first calibration step for the targeted alignment of the deflected beam 37' with a center point of a cross-sectional face 43 of an opening of the photo detector 8' is again accomplished by a displacement of the first part 22 on the cover plate 6, which defines the reference plane $E_{xy}$, of the module housing 3 relative to the light receiver unit 1'. By a subsequent displacement of the second part 23 relative to the positionally fixed first part 22, a focal condition with regard to the location of the image plane of the coupling lens 12' relative to the location of the opening cross-sectional face 43 of the photodetector 8' is then set, as already described.

The two calibration steps can be controlled by monitoring an output signal of the photodetector 8' and performed, for instance regulated as a function of this signal.

Figure 3:
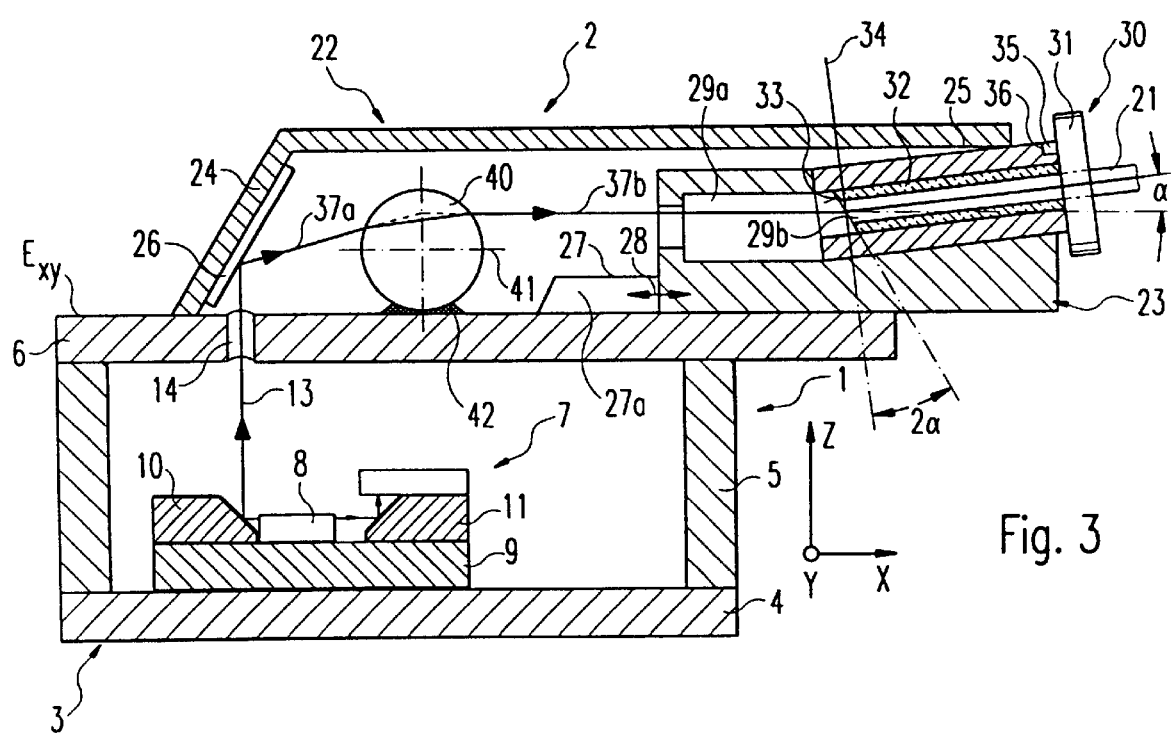
FIG. 3 is a diagrammatic sectional view of a further optoelectronic component including a light emitter and a lens in the beam path between a deflection mirror and a fiber connector.

FIG. 3 shows a further exemplary embodiment of an optoelectronic component 1, 2, which differs from the example shown in FIG. 1 essentially in that the optical element, in the form of a lens 40, is now accommodated in the connection unit 2. Once again, comparable elements to those of FIG. 1 are identified by the same reference numerals.

The beam of light 13, emitted by the laser chip 8 and deflected by the deflection prism 10, strikes the deflection mirror 26 and is reflected by it at an acute angle to the reference plane $E_{xy}$, in the form of an inclined beam of light 37a. The inclined beam 37a strikes the surface of the lens 40 outside the optical axis 41 and at a nonperpendicular angle, the consequence of which is that light reflected from the surface of the lens 40 cannot return into the laser chip 8. The inclined beam 37a is then refracted in the lens 40 and emerges from the lens 40 as a beam of light 37b extending in the x-direction, parallel to the reference plane $E_{xy}$.

The lens 40 may be mounted either on the cover plate 6 of the module housing 3, for example through the use of an adhesive 42, or, in a manner not shown, it can be mounted in a mounting that is mounted on the first part 22.

The setting of the respective calibrated locations of the two parts 22 and 23 is done analogously to the procedure described in conjunction with FIG. 1. However, in the case of the component 1, 2 shown here, because of the lens 40 that influences the direction of the beam path, it is somewhat more difficult to assure that the beam 37b leaving the lens 40 in the x-direction will extend, after the first calibration step, in a good approximation parallel to the reference plane $E_{xy}$, or in other words will have a vanishing or disappearing z-component.

A vanishing z-component of the beam 37b can, however, be attained with good accuracy by adapting the tilting of the deflection mirror 26 relative to the reference plane, as well as the size, position, and refractive force of the lens 40, exactly to one another. However, because of unavoidable production variations the occasional occurrence of slight deviations from the ideal course of the beam 37b without a z-component (once the first calibration step has been performed) cannot be entirely precluded in this case, either. Such deviations have the effect that during the second calibration step (setting of the focal condition), the light spot generated by the beam 37b on the end face 33 shifts undesirably out of the center of the end face 33. This effect can be reduced by providing that the second part 23, before the first calibration step is performed, is already prepositioned with the highest possible precision in the first part 22, so that the setting paths that can be performed in the second calibration step remain short. The better the prepositioning, the greater the production variations that can be tolerated. Maximum setting paths in the range from a few tens to a hundred micrometers can, for instance, be achieved by a suitable prepositioning.

The light emitter unit 1 shown in FIG. 3 can be replaced by a light receiver unit 1', by analogy with FIG. 2.

All the exemplary embodiments shown are fundamentally comparable and always make it possible to convert a triaxial calibration of an optoelectronic component into a biaxial calibration in the reference plane $E_{xy}$. The calibration uses two calibration steps that can be performed separately and by which a direction of a deflected beam of light and a focal property of that beam can be set substantially independently from one another.

We claim:

1. A method for calibrating an optoelectronic component, the method which comprises:

providing a light emitter unit having a light emitter for transmitting a beam of light along a first direction;

providing a connection unit including a first part and a second part, the first part having a deflection mirror, the second part provided for mounting a fiber-optic wave guide and being displaceable toward and away from the deflection mirror relative to the first part;

providing an optical element disposed in a beam path between the light emitter and the second part;

turning on the light emitter;

setting an initial relative position between the first part and the second part;

calibrating the first part relative to the light emitter unit, while maintaining the initial relative position between the first part and the second part, by displacing the first part in a structurally predetermined reference plane intersecting the first direction, such that the beam of light strikes the deflection mirror and a deflected beam of light leaves the deflection mirror, the deflected beam of light striking an end face of the fiber-optic wave guide essentially centrally in a second direction extending essentially parallel to the reference plane;

fixing a relative position between the first part and the light emitter unit in a first calibrated position;

calibrating a the second part relative to the first part by displacing the second part in the second direction relative to the first part such that a given condition with respect to a location of an optical image plane of the optical element relative to a location of the end face of the fiber-optic wave guide is met; and fixing a final relative position between the first part and the second part in a second calibrated position.

2. The method according to claim 1, which comprises orienting the structurally predetermined reference plane in a direction perpendicular to the first direction.

3. The method according to claim 1, which comprises providing the optical element with a lens disposed in the beam path between the deflection mirror and the fiber-optic wave guide.

4. The method according to claim 3, which comprises selecting a size and a position of the lens such that the beam path passes decentralized through the lens after the step of fixing the relative position between the first part and the light emitter unit in the first calibrated position.

5. A method for calibrating an optoelectronic component, the method which comprises:

providing a light receiver unit having a light receiver for receiving a beam of light running along a first direction;

providing a connection unit including a first part and a second part, the first part having a deflection mirror, the second part provided for mounting a fiber-optic wave guide and being displaceable toward and away from the deflection mirror relative to the first part;

providing an optical element disposed in a beam path between the light receiver and the second part;

turning on an external light emitter coupled to the fiber-optic wave guide at a free end thereof such that the beam of light leaves the fiber-optic wave guide along a second direction;

turning on the light receiver;

setting an initial relative position between the first part and the second part;

calibrating the first part relative to the light receiver unit, while maintaining the initial relative position between the first part and the second part, by displacing the first part in a structurally predetermined reference plane intersecting the first direction and being essentially parallel to the second direction, such that the beam of light strikes the deflection mirror and a deflected beam of light strikes substantially centrally an opening cross-sectional face of the light receiver in the first direction;

fixing a relative position between the first part and the light receiver unit in a first calibrated position;

calibrating the second part relative to the first part by displacing the second part in the second direction relative to the first part such that a given condition with respect to a location of an optical image plane of the optical element relative to a given location of the opening cross-sectional face of the light receiver is met; and fixing a final relative position between the first part and the second part in a second calibrated position.

6. The method according to claim 5, which comprises orienting the structurally predetermined reference plane in a direction perpendicular to the first direction.

7. The method according to claim 5, which comprises providing the optical element with a lens disposed in the beam path between the deflection mirror and the fiber-optic wave guide.

8. The method according to claim 7, which comprises selecting a size and a position of the lens such that the beam path passes decentralized through the lens after the step of fixing the relative position between the first part and the light emitter unit in the first calibrated position.

9. An optoelectronic component, comprising:

a light emitter unit containing a light emitter for transmitting a beam of light extending along a first direction;

a connection unit in contact with said-light emitter unit and having a first part at a first end and a second part at a second end thereof;

said first part being displaceable with respect to said light emitter unit in a structurally predetermined reference plane intersecting the first direction;

said second part configured for mounting a fiber-optic wave guide such that the beam of light extends in a second direction substantially parallel to the structurally predetermined reference plane on entering the fiber-optic wave guide;

a deflection mirror, mounted on said first part, for deflecting the beam of light between the fiber-optic wave guide and said light emitter, said second part being displaceable relative to said first part in the second direction toward or away from said deflection mirror; and an optical element disposed in a path of the beam of light between the fiber-optic wave guide and the light emitter.

10. The optoelectronic component according to claim 9, including a module housing with a cover plate, said module housing accommodating said light emitter unit, said cover plate defining the structurally predetermined reference plane.

11. The optoelectronic component according to claim 9, wherein said first part includes a first guide face extending in the second direction and said second part includes a counterpart, second guide face in sliding contact with said first guide face.

12. The optoelectronic component according to claim 9, wherein said second part has a socket for accepting a fiber connector for the fiber-optic wave guide.

13. The optoelectronic component according to claim 9, including a fiber-optic wave guide mounted in said second part, said fiber-optic wave guide having a central axis inclined by a given angle relative to the second direction and having an end face inclined by twice the given angle relative to a plane perpendicular to said central axis.

14. The optoelectronic component according to claim 12, including a fiber-optic wave guide mounted in said second part, said socket having a central axis inclined by a given angle relative to the second direction, and said fiber-optic wave guide having an end face inclined by twice the given angle relative to a plane perpendicular to said central axis.

15. An optoelectronic component, comprising:
   a light receiver unit containing a light receiver for receiving a beam of light extending along a first direction;
   a connection unit in contact with said light receiver unit and having a first part at a first end and a second part at a second end thereof;
   said first part being displaceable with respect to said light receiver unit in a structurally predetermined reference plane intersecting the first direction;
   said second part configured for mounting a fiber-optic wave guide such that the beam of light extends in a second direction substantially parallel to the structurally predetermined reference plane on emerging from the fiber-optic wave guide;
   a deflection mirror, mounted on said first part, for deflecting the beam of light between the fiber-optic wave guide and said light receiver, said second part being displaceable relative to said first part in the second direction toward or away from said deflection mirror; and
   an optical element disposed in a path of the beam of light between the fiber-optic wave guide and the light receiver.

16. The optoelectronic component according to claim 15, including a module housing with a cover plate, said module housing accommodating said light receiver unit, said cover plate defining the structurally predetermined reference plane.

17. The optoelectronic component according to claim 15, wherein said first part includes a first guide face extending in the second direction and said second part includes a counterpart, second guide face in sliding contact with said first guide face.

18. The optoelectronic component according to claim 15, wherein said second part has a socket for accepting a fiber connector for the fiber-optic wave guide.

19. The optoelectronic component according to claim 15, including a fiber-optic wave guide mounted in said second part, said fiber-optic wave guide having a central axis inclined by a given angle relative to the second direction and having an end face inclined by twice the given angle relative to a plane perpendicular to said central axis.

20. The optoelectronic component according to claim 18, including a fiber-optic wave guide mounted in said second part, said socket having a central axis inclined by a given angle relative to the second direction, and said fiber-optic wave guide having an end face inclined by twice the given angle relative to a plane perpendicular to said central axis.

* * * * *